US009358846B2

(12) United States Patent
Singh et al.

(10) Patent No.: US 9,358,846 B2
(45) Date of Patent: Jun. 7, 2016

(54) VEHICLE WEIGHT AND CENTER OF GRAVITY ESTIMATION SYSTEM AND METHOD

(71) Applicants: Kanwar Bharat Singh, Stow, OH (US); John Michael Fenkanyn, Akron, OH (US); Amrita Patel, Copley, OH (US); Peter Jung-min Suh, Copley, OH (US); Arthur Allen Goldstein, Mayfield Village, OH (US)

(72) Inventors: Kanwar Bharat Singh, Stow, OH (US); John Michael Fenkanyn, Akron, OH (US); Amrita Patel, Copley, OH (US); Peter Jung-min Suh, Copley, OH (US); Arthur Allen Goldstein, Mayfield Village, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 254 days.

(21) Appl. No.: 13/655,787

(22) Filed: Oct. 19, 2012

(65) Prior Publication Data
US 2014/0114558 A1    Apr. 24, 2014

(51) Int. Cl.
*G06F 17/00* (2006.01)
*B60C 23/04* (2006.01)
*G01G 19/08* (2006.01)

(52) U.S. Cl.
CPC .......... *B60C 23/0488* (2013.01); *G01G 19/086* (2013.01)

(58) Field of Classification Search
CPC ....................................................... G06F 17/00
USPC .......................................................... 701/124
See application file for complete search history.

(56) References Cited

U.S. PATENT DOCUMENTS

| | | | | |
|---|---|---|---|---|
| 4,551,806 A | * | 11/1985 | Storace | B29C 53/8041 156/128.1 |
| 5,267,161 A | * | 11/1993 | Kallenbach | B60G 17/018 280/5.501 |
| 5,610,340 A | * | 3/1997 | Carr | G01L 9/0073 73/718 |
| 5,694,322 A | * | 12/1997 | Westerlage | G01C 21/26 340/870.07 |
| 5,970,481 A | * | 10/1999 | Westerlage | G01C 21/26 705/31 |
| 6,962,075 B2 | | 11/2005 | Bertrand | 73/146 |
| 7,104,438 B2 | * | 9/2006 | Benedict | B60C 23/0493 235/375 |

(Continued)

FOREIGN PATENT DOCUMENTS

| | | |
|---|---|---|
| CN | 1860042 | 11/2006 |
| CN | 1912566 | 2/2007 |

(Continued)

OTHER PUBLICATIONS

Machine translation of JP 2004-237947A submitted by the applicant in an IDS( http://www4.ipdl.inpit.go.jp/Tokujitu/tjsogodbenk.ipdl).*

(Continued)

*Primary Examiner* — John R Olszewski
*Assistant Examiner* — Jean-Paul Cass
(74) *Attorney, Agent, or Firm* — Edward T. Kennedy

(57) ABSTRACT

A load estimation system and method for estimating vehicle load includes a tire rotation counter for generating a rotation count from rotation of a tire; apparatus for measuring distance travelled by the vehicle; an effective radius calculator for calculating effective radius of the tire from the distance travelled and the rotation count; and a load estimation calculator for calculating the load carried by the vehicle tire from the effective radius of the tire. A center of gravity height estimation may be made from an estimated total load carried by the tires supporting the vehicle pursuant to an estimation of effective radius for each tire and a calculated load carried by each tire from respective effective radii.

15 Claims, 9 Drawing Sheets

(56) References Cited

U.S. PATENT DOCUMENTS

| | | | |
|---|---|---|---|
| 7,404,317 B2 | 7/2008 | Mancosu et al. | 73/146 |
| 7,502,676 B2 * | 3/2009 | Ono | B60T 8/172 701/41 |
| 7,546,764 B2 | 6/2009 | Morinaga et al. | 73/146 |
| 7,792,617 B2 * | 9/2010 | Joyce | B60T 8/172 180/411 |
| 7,882,732 B2 * | 2/2011 | Haralampu | B60C 23/0425 73/146.5 |
| 8,065,067 B2 * | 11/2011 | Svendenius | B60T 8/172 701/80 |
| 8,083,557 B2 * | 12/2011 | Sullivan | B60F 3/0007 290/54 |
| 2005/0000278 A1 * | 1/2005 | Haralampu | B60C 23/0425 73/146 |
| 2006/0173603 A1 * | 8/2006 | Mohan | B60K 28/16 701/71 |
| 2006/0253243 A1 * | 11/2006 | Svendenius | B60T 8/172 701/70 |
| 2007/0106446 A1 * | 5/2007 | Phillips | B60T 8/17616 701/71 |
| 2008/0243348 A1 * | 10/2008 | Svendenius | B60T 8/172 701/90 |
| 2009/0186535 A1 * | 7/2009 | Sullivan | B60F 3/0007 440/6 |

FOREIGN PATENT DOCUMENTS

| | | | |
|---|---|---|---|
| CN | 102141479 | 8/2011 | |
| CN | 102282052 | 12/2011 | |
| DE | 102010004149 | 7/2011 | G01L 17/00 |
| EP | 1751500 A1 * | 2/2007 | |
| JP | 2004-067009 | 3/2004 | |
| JP | 2004067009 | 3/2004 | B60C 19/00 |
| JP | 2004-237947 | 8/2004 | |
| JP | 2004237947 | 8/2004 | B60C 19/00 |
| JP | 2007163158 | 6/2007 | B60C 23/06 |

OTHER PUBLICATIONS

European Search Report received by Applicants Feb. 17, 2014.
Chinese Search Report dated Oct. 18, 2013.

* cited by examiner

VEHICLE WEIGHT AND CENTER OF GRAVITY ESTIMATION SYSTEM AND METHOD

FIELD OF THE INVENTION

The invention relates generally to tire monitoring systems for collecting measured tire parameter data during vehicle operation and, more particularly, to systems for estimating vehicle tire loading based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire loading are important considerations for vehicle operation and safety. It is accordingly further desirable to measure tire loading and communicate load information to a vehicle operator and/or vehicle systems such as braking in conjunction with the measured tire parameters of pressure and temperature.

SUMMARY OF THE INVENTION

According to an aspect of the invention, a load estimation system and method for estimating a load carried includes a vehicle tire; a tire rotation counter for generating a rotation count from rotation of the tire; apparatus for measuring distance travelled by the vehicle; an effective radius calculator for calculating effective radius of the tire from the distance travelled and the rotation count; and a load estimation calculator for calculating the load carried by the vehicle tire from the effective radius of the tire. The distance measuring apparatus may constitute a global positioning system.

According to another aspect of the invention, the time for one rotation is determined and vehicle speed is calculated from the effective radius of the tire and the time for one rotation.

In another aspect, tire pressure and temperature are measured and measured pressure and temperature data is used with the effective radius, and vehicle speed in calculating a load estimation by means of a load estimation algorithm.

The tire vertical stiffness, pursuant to an additional aspect, is calculated from the tire pressure, and vehicle speed and used as input into the load estimation algorithm.

A center of gravity height estimation is, according to a further aspect, made from an estimated total load carried by the vehicle, the total load being determined from a summation of the individual loads carried by the vehicle tires made pursuant to the estimation of effective radius calculated pursuant to the system and method summarized above.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
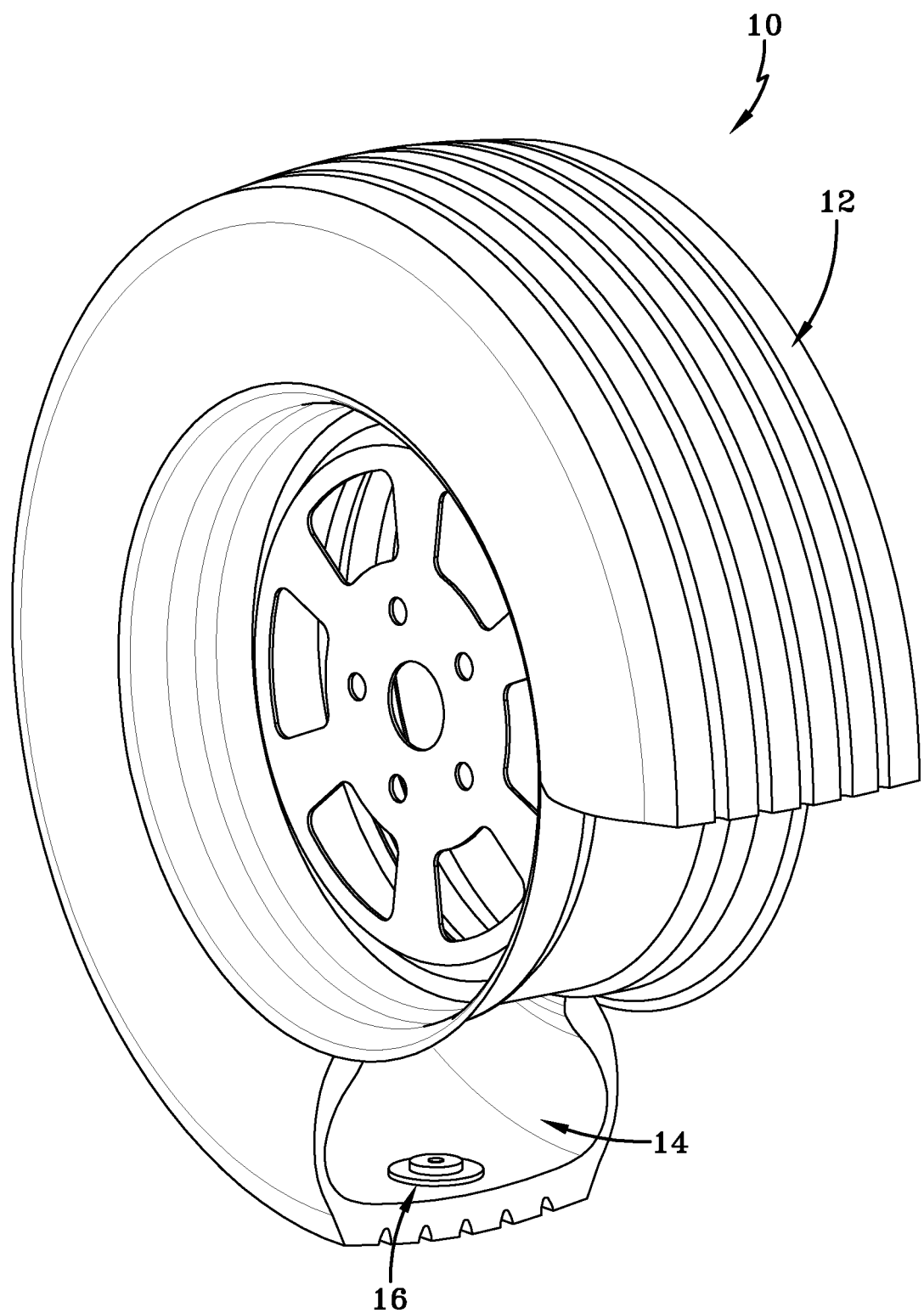
FIG. 1 is a perspective view in partial section of a tire and TPMS assembly.

Referring to FIG. 1, the system 10 for estimating tire load based on effective rolling radius (loaded radius) utilizes one or more of the tires 12 supporting a vehicle such as a passenger car or commercial truck. The tire 12 is of conventional construction including a central tire cavity 14. A tire pressure measuring system (TPMS) electronics package or module 16 of a commercially available type is mounted to a tire inner liner surface in communication with the tire cavity 14 and electronically generates signals representing a tire rotation pulse count; inflation pressure within the tire cavity; tire cavity temperature; and a tire numerical identification number as outputs which are used in the performance of the subject load calculation.

Figure 2:
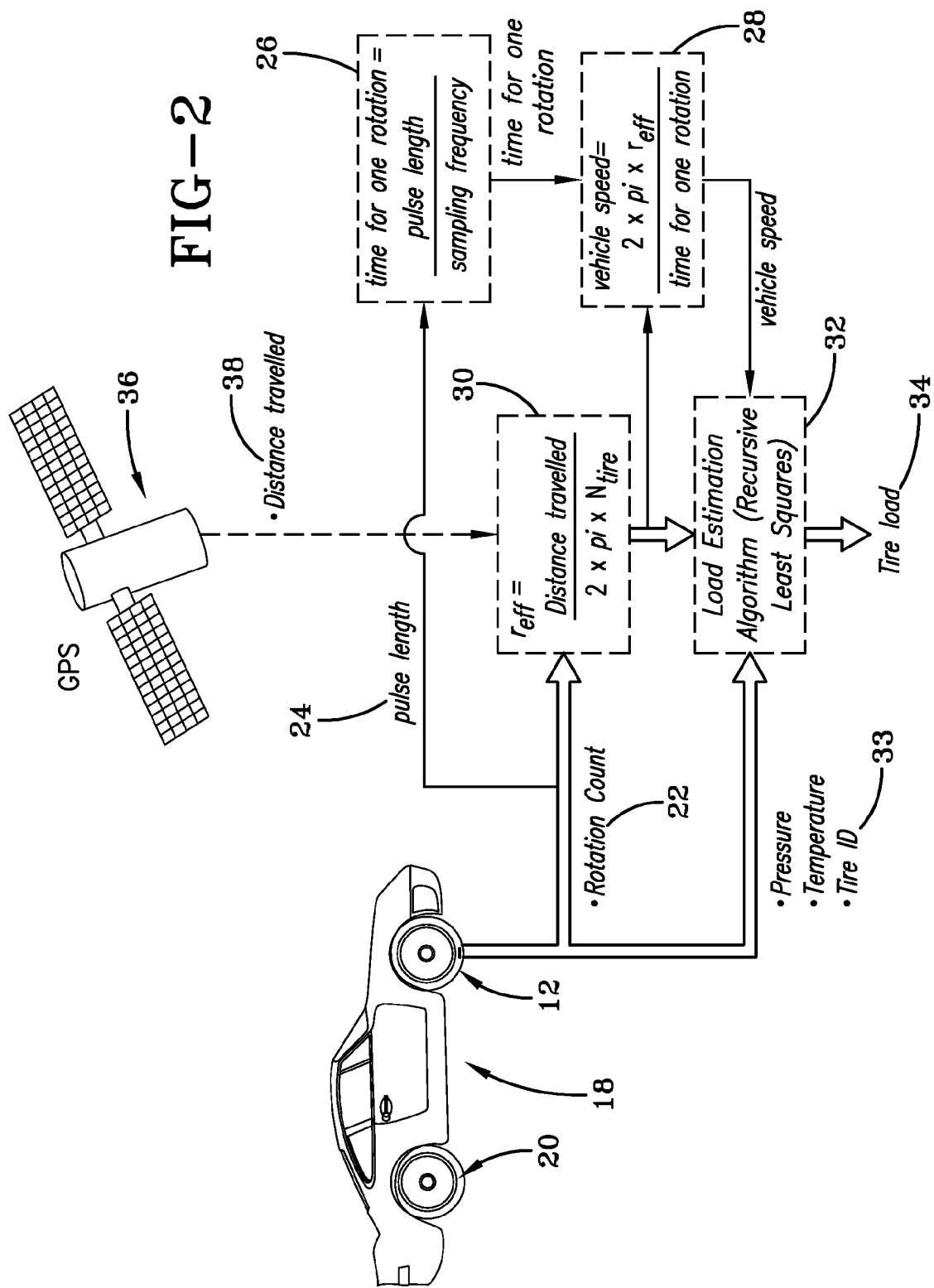
FIG. 2 is a flow diagram schematic of the tire load estimation system and method.

The estimation of a vehicle load supported by a tire is depicted in diagrammatic form in FIG. 2. The vehicle tire 12 supports a portion of the entire vehicle load in conjunction with the other tires 20 of the vehicle. For the purpose of explanation, the estimation approach and methodology will be explained, it being understood that a like estimation would be performed for each of the tires supporting the vehicle. The total loading of the vehicle would thus be computed by combining the estimated loading on all the tires.

The TPMS electronic device 16 mounted to tire 12 generates a pulse 24 with each tire revolution by employing a sensor, such as a piezoelectric film sensor (not shown), that creates a pulse representative of the tire patch length against the ground surface with each tire revolution. A rotation count 22 is thus recorded by detecting the number of pulses received from the sensor. It will be appreciated that the proposed load estimation scheme, however, does not rely on footprint length information as reflected in the pulse length since the tire contact patch length information may be difficult to ascertain from the pulse 24. The subject system uses effective rolling radius information in order to avoid using the difficult-to-determine contact patch length of a tire footprint.

The time for one rotation of the tire equals the pulse length divided by the sampling frequency and is calculated as indicated by block 26. A GPS system 36 or vehicle-based system may be used to determine the distance travelled by the vehicle in N revolutions of the tire and the distance travelled 38 used in calculating the effective rolling radius of the tire as indicated at block 30. The effective radius of the tire equals the distance travelled 38 divided by the quantity ($2 \times pi \times N_{tire}$). The effective radius of the loaded tire may then be used at block 28 to calculate vehicle speed as $2 \times pi \times reff$ divided by the time for one rotation (as calculated at block 26).

The tire-mounted TPMS module 16 is used to generate pressure, temperature, and tire identification data inputs 33. The tire data 33 are inputs to a load estimation algorithm (Recursive Least Squares 32 with the vehicle speed and reff calculations 28, 30, respectively, as described previously. The load estimation algorithm 32 then calculates a tire load estimation 34 based on the tire derived inputs 33, the effective tire rolling radius 64, and the vehicle speed.

Figure 5:
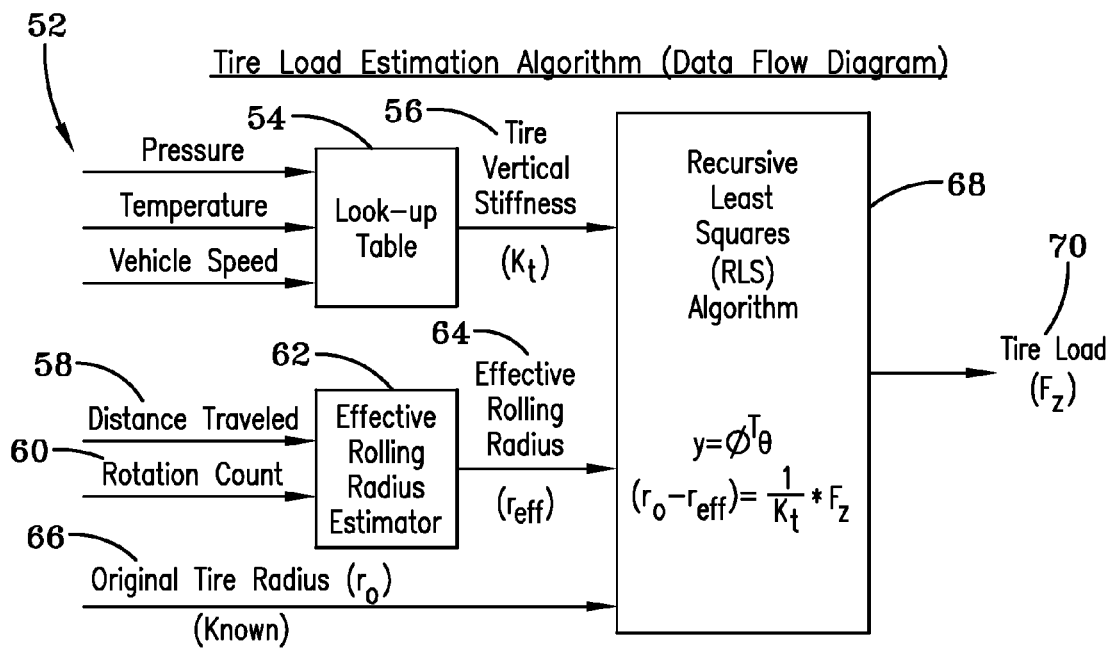
FIG. 5 is a data flow diagram of the tire loads estimation algorithm.

It will be appreciated that the tire vertical stiffness is affected by the tire pressure, tire temperature, and vehicle speed. The tire vertical stiffness will affect the degree to which the tire will undergo an effective rolling radius change. Accordingly, it is important to factor in tire vertical stiffness when estimating the loading on a tire by means of effective rolling radius. Tire vertical stiffness may be determined for the sundry combinations of pressure, temperature, and vehicle speed and incorporated into a look-up table. FIG. 5 illustrates a tire load estimation algorithm data flow diagram in accordance with the invention. The tire measured inputs of pressure and temperature and vehicle speed are determined by measurement and are used to consult a look-up table 54 in order to ascertain tire vertical stiffness. The Tire Vertical Stiffness (Kt) 56 is extracted from the look-up table 54 once the parameters of pressure, temperature, and vehicle speed are known. Contemporaneously, the distance travelled 58 value is determined by means of the GPS 36 or vehicle-based system and, combined with rotation count 60, the effective rolling radius (reff) of the tire is determined. The Tire Vertical Stiffness (Kt), the Effective Rolling Radius (reff) 64, and the original tire radius (Ro) are inputs into a Recursive Least Squares (RLS) algorithm 68 and used in the formula identified in FIG. 5. Ro, reff, and Kt are the known inputs to the recursive least squares algorithm (RLS) where "y" is the output; Ψ represents the regression vector; and (Fz) represents the unknown parameter, Tire Load. Solving for tire load Fz may be done for each of the vehicle tires and combined to yield the total load of the vehicle. It will be noted that tire load is the only unknown in the RLS Algorithm. The tire vertical stiffness is known for a given tire (as identified by the tire ID) and operating conditions of pressure, temperature, and vehicle speed. Ro, the original radius of the tire is likewise a known quantity once an identification of the tire has been made.

Figure 3:
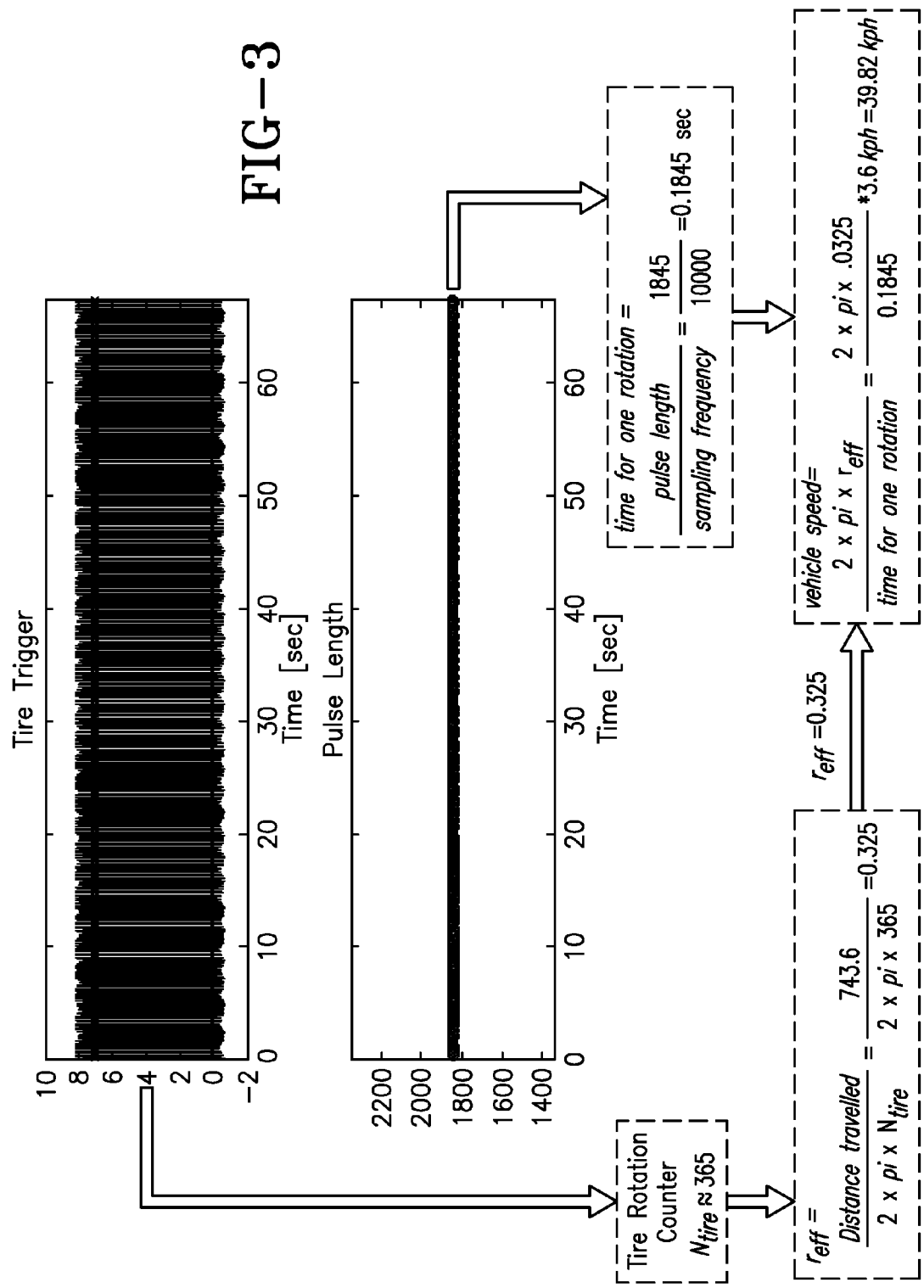
FIG. 3 is a representative example of effective radius and vehicle speed calculation.

FIG. 3 shows a representative calculation of effective rolling radius and vehicle speed using distance travelled and revolution count Ntire for the reff. The Ntire is approximately 365 and distance travelled is 743.6, yielding a reff value of 0.325. For vehicle speed, the time for one rotation is determined by taking the pulse length of 1845 and dividing it by sampling frequency 10000 to yield 0.1845 seconds. The vehicle speed is then calculated by the formula shown using the reff and time for one rotation amounts. The vehicle speed is thus determined to be 39.82 kph.

Figure 4A:
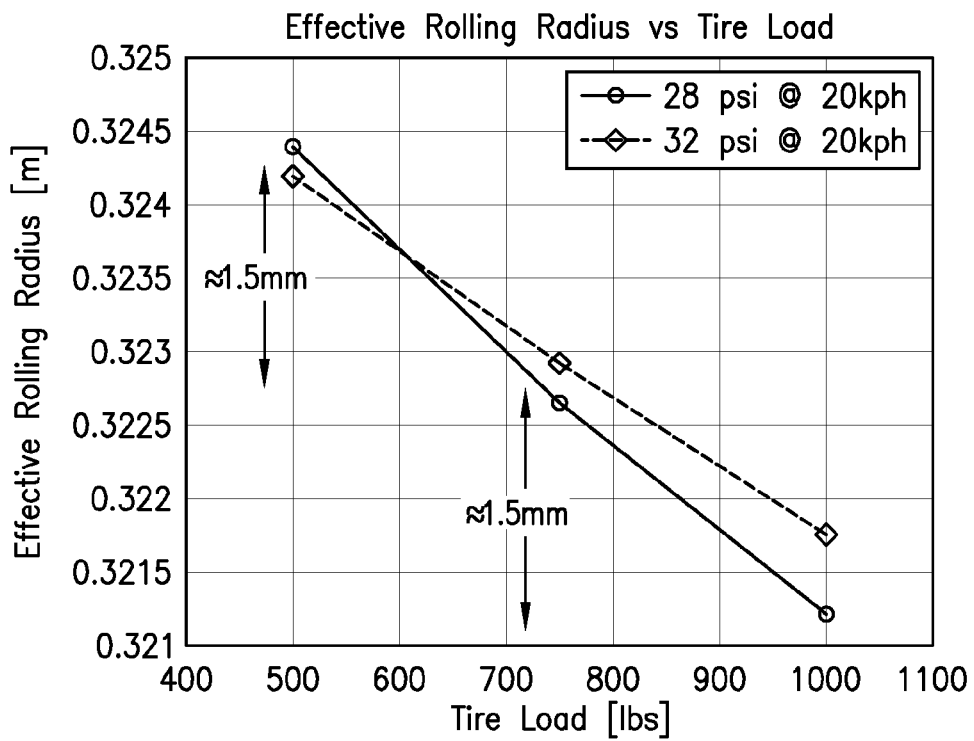
FIG. 4A is a graph of effective rolling radius vs. tire load for two representative tire inflation pressures at 20 kph.
Figure 4B:
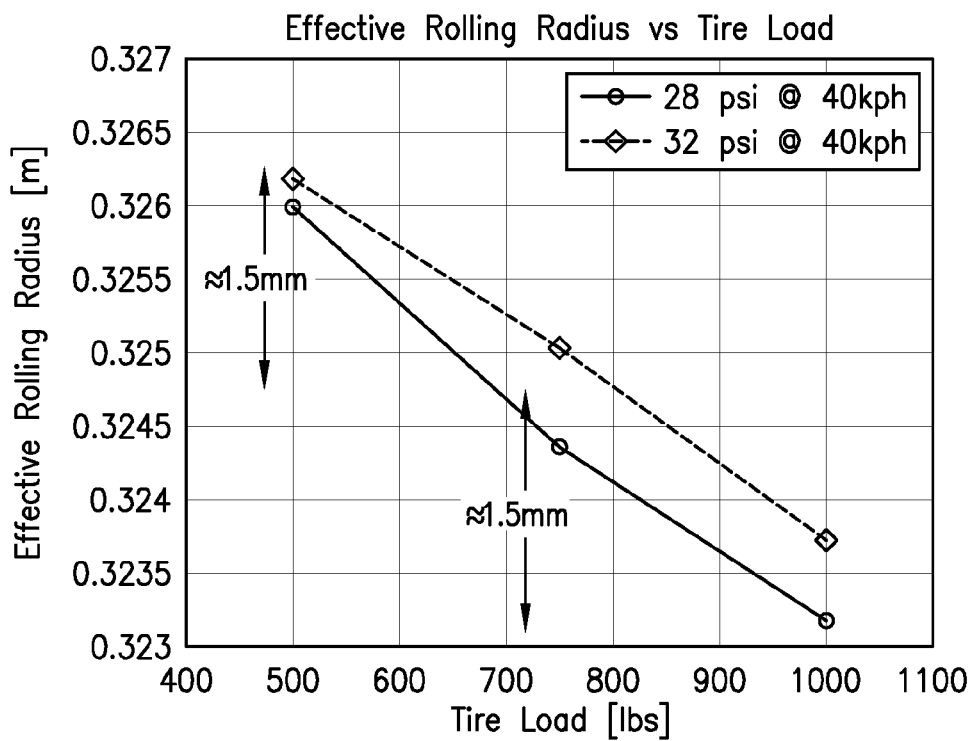
FIG. 4B is a graph of effective rolling radius vs. tire load for two representative tire inflation pressures at 40 kph.
Figure 4C:
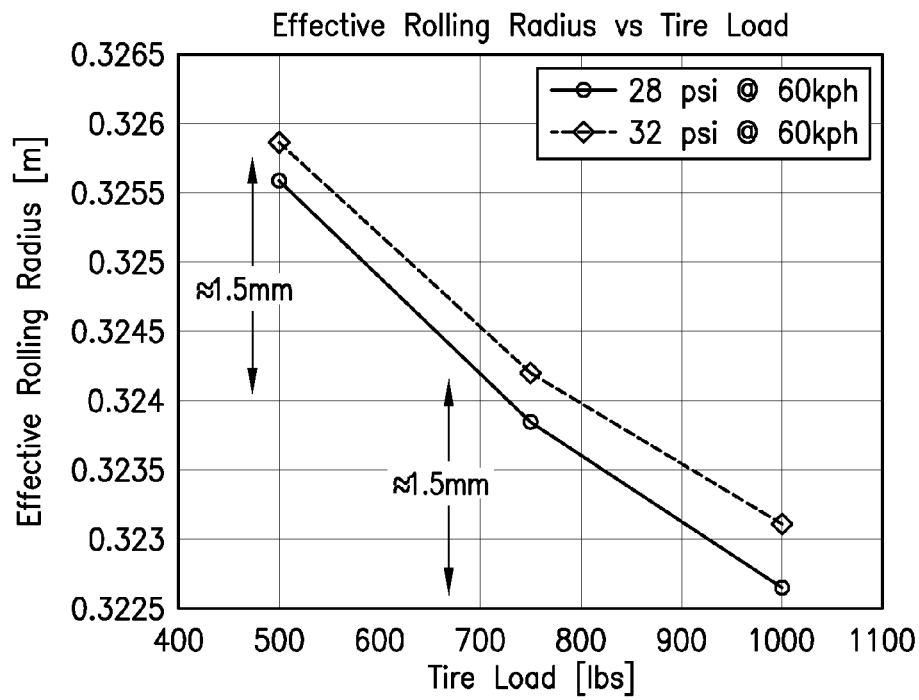
FIG. 4C is a graph of effective rolling radius vs. tire load for two representative tire inflation pressures at 60 kph.

FIGS. 4A, B, and C show graphs of effective rolling radius reff in meters vs. tire load for two tire pressure conditions of 28 psi and 32 psi. The graphs were generated from laboratory fixed spindle machine analysis. FIG. 4A, B, C are graphs for the vehicle speeds of 20, 40, and 60 kph, respectively. It will be seen that the effective rolling radius reff at a given tire inflation changes with vehicle speed. It will further be noted that estimated load sensitivity is approximately a 1.5 mm variation in rolling radius for every 250 pounds variation in the tire load. Thus, a conclusion may be drawn that the rolling radius estimation will yield an acceptably accurate estimation of tire load under a normal range of vehicle speeds at a normal range of tire inflation levels.

From the foregoing, it will be appreciated that the subject system obtains an estimation of vehicle weight from a tire attached TPMS unit such as a piezo sensor or other suitable sensor which gives a pulse as the sensor traverses through the contact patch region. The algorithm employed does not use contact patch length information to estimate tire load, since such patch measurements can prove to be problematic. Rather, the system uses effective rolling radius information. The information of the load total and the load distribution may be used by advanced brake control systems such as electronic brake distribution (EBD) systems to optimize the brake system performance and reduce vehicle stopping distance. For commercial vehicles, the weight estimated on each wheel may be averaged to produce an estimate of the vehicle weight which can then be transmitted to a central location, whereby eliminating the need for weigh stations.

Figure 6:
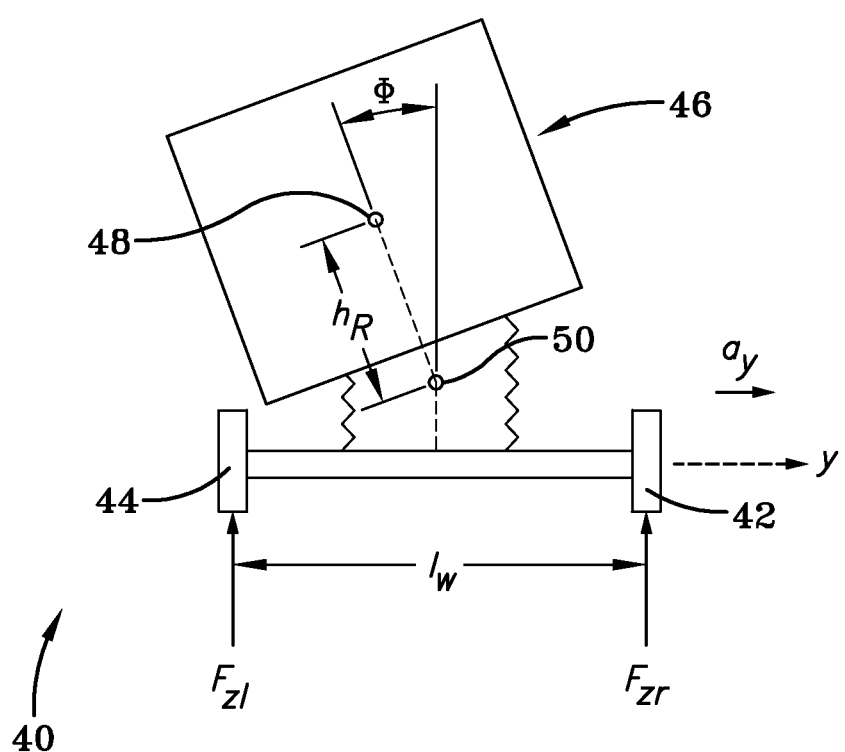
FIG. 6 is a schematic diagram of a vehicle undergoing a tipping moment.

The estimation of vehicle tire load distribution and total load magnitude may further be useful in estimating vehicle center of gravity (CG) height, critical information for roll stability control (RSC) algorithm. The tire load information (total mass) has application in state estimation in vehicle roll dynamics as will be understood from FIG. 6. With reference to FIG. 6, a free body diagram 40 is shown representing a vehicle free-body mass 46 supported by two pair of wheels, a right wheel pair 42 and a left wheel pair 44. Taking moments about the roll center, the roll dynamics equation can be written as:

$$(I_{xx}+mh^2_R)\ddot{\phi}=ma_y h_R \cos\phi+mgh_R \sin\phi-\tfrac{1}{2}kl^2_s \sin\phi-\tfrac{1}{2}cl^2_s(\cos\phi)\dot{\phi}$$

An important challenge in the design of an active rollover prevention system is the calculation of the rollover index, which indicates the likelihood of the vehicle to roll over and is used to trigger differential braking to prevent rollover. Accurate calculation of the rollover index is important to ensure that:

$$R = \frac{2h_R a_y \cos\phi + 2h_R g \sin\phi}{l_w g}$$

Where $a_y$ is the lateral acceleration of the vehicle measured on the unsprung mass, $\phi$ is the roll angle, and $h_R$ is the height of the center of gravity (CG) of the vehicle from the roll center of the sprung mass. It should be noted that the rollover index of (2) needs the following:

(A) measurement of lateral acceleration $a_y$;
(B) roll angle $\phi$;
(C) knowledge of the track width $l_w$;
(D) knowledge of the height of the CG $h_R$.

The measurement of lateral acceleration $a_y$; and roll angle $\phi$ are available from IMU (Inertial Measurement Unit) and the roll angle can be estimated from roll rate using a Kalman filtering approach. The track width $l_w$ is a constant, vehicle defined, value.

CG Height Estimation $$(I_{xx}+mh^2_R)\ddot{\phi}=ma_y h_R \cos\phi+mgh_R \sin\phi-\tfrac{1}{2}kl^2_s \sin\phi-\tfrac{1}{2}cl^2_s(\cos\phi)\dot{\phi}$$

This can be rewritten in a parameter identification form as:

$$y = I_{xx}\frac{s}{\tau s+1}\dot\phi + \frac{1}{2}kl_s^2\sin\phi + \frac{1}{2}cl_s^2(\cos\phi)\dot\phi$$
$$\psi = ma_y\cos\phi + mg\sin\phi$$
$$\theta = h_R$$

where s is the Laplace operator, and the influence of the term $mh^2_R$ has been ignored and assumed to be significantly smaller than $I_{xx}$.

RLS Algorithm

The procedure for solving the RLS problem is as follows:

Step 0: Initialize the unknown parameter θ(0) and the covariance matrix P(0); set the forgetting factor λ.

Step 1: Measure the system output y(t) and compute the regression vector φ(t).

Step 2: Calculate the identification error e(t):

$$e(t)=y(t)-\phi^T(t)\cdot\theta(t-1)$$

Step 3: Calculate the gain k(t):

$$k(t)=P(t-1)\phi(t)[\lambda+\phi^T(t)P(t-1)\phi(t)]^{-1}$$

Step 4: Calculate the covariance matrix:

$$P(t)=(1-k(t)\phi^T(t))\lambda^{-1}P(t-1)$$

Step 5: Update the unknown parameter:

$$\theta(t)=\theta(t-1)+k(t)e(t)$$

Step 6: Repeat Steps 1~5 for each time step.

Figure 7:
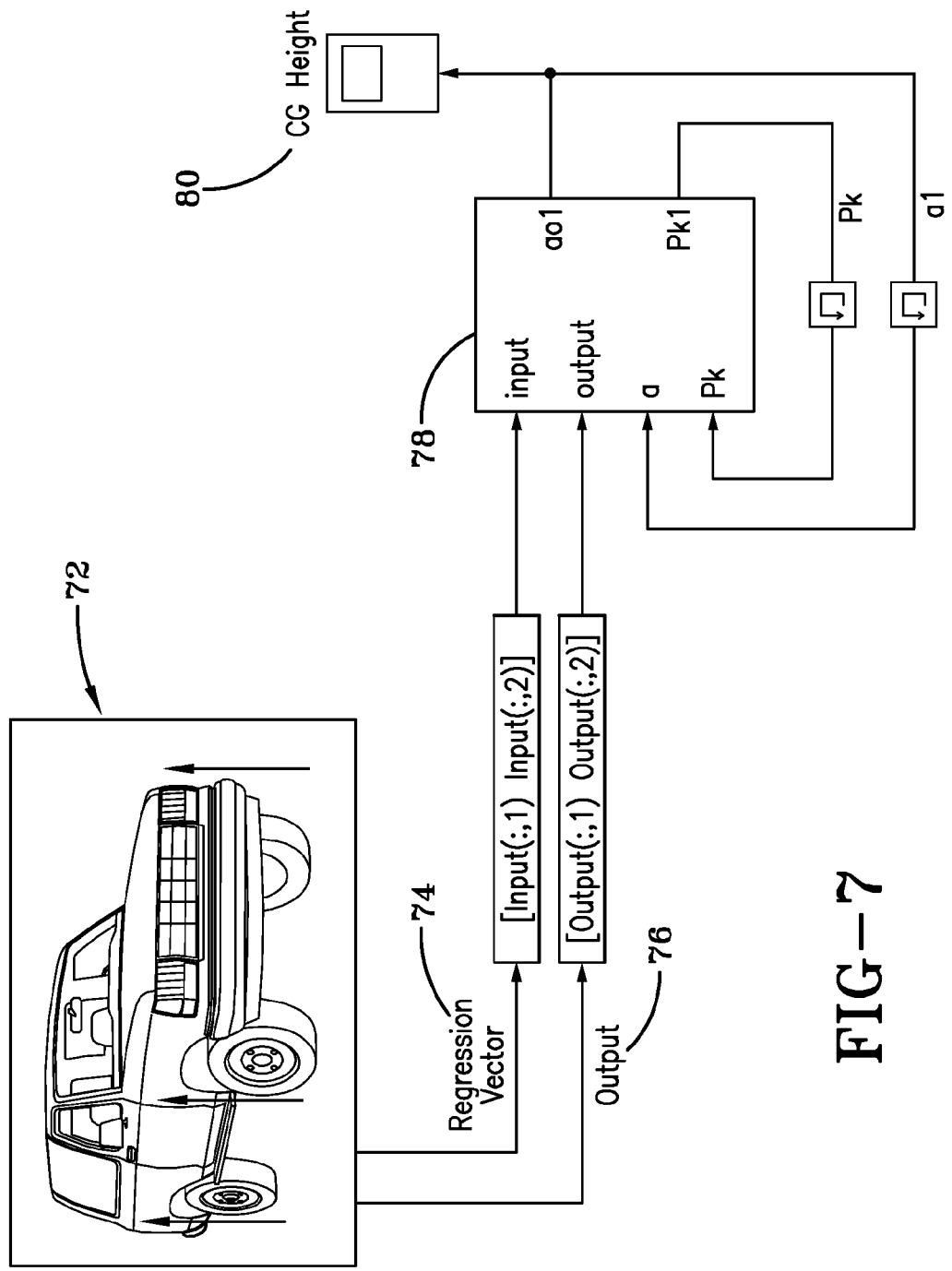
FIG. 7 is a data flow diagram schematic of the center of gravity height estimation system and method.

The Estimator procedure implementation model is indicated in FIG. 7. The vehicle 72 is analyzed using the Regression Vector 74 ($\psi=ma_y \cos\phi+mg\sin\phi$) and Output $$\left(y = I_{xx}\frac{s}{\tau s+1}\dot\phi + \frac{1}{2}kl_s^2\sin\phi + \frac{1}{2}cl_s^2(\cos\phi)\dot\phi\right).$$

Using the equation $y=\psi^T\theta$.

Where y is the output; Ψ is the regression vector; and θ is the unknown parameter. The inputs of regression vector 74 and output 76 are used respectively as input and output in the Recursive Least Squares (with forgetting factor) Parameter Estimation Algorithm 78 to solve for the unknown parameter of CG Height.

Figure 8A:
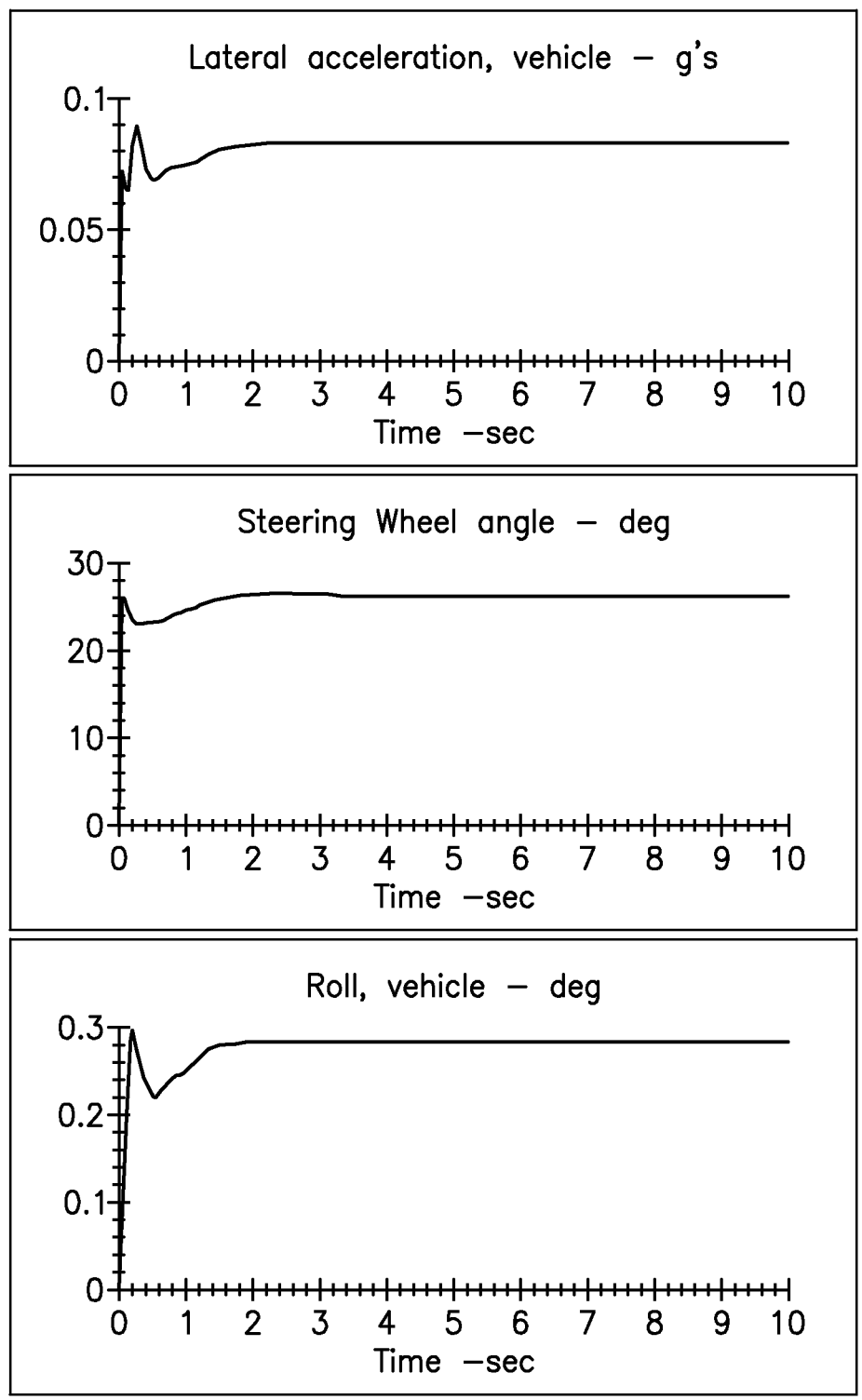
FIG. 8A is a set of graphs of lateral acceleration, steering wheel angle and roll over time.
Figure 8B:
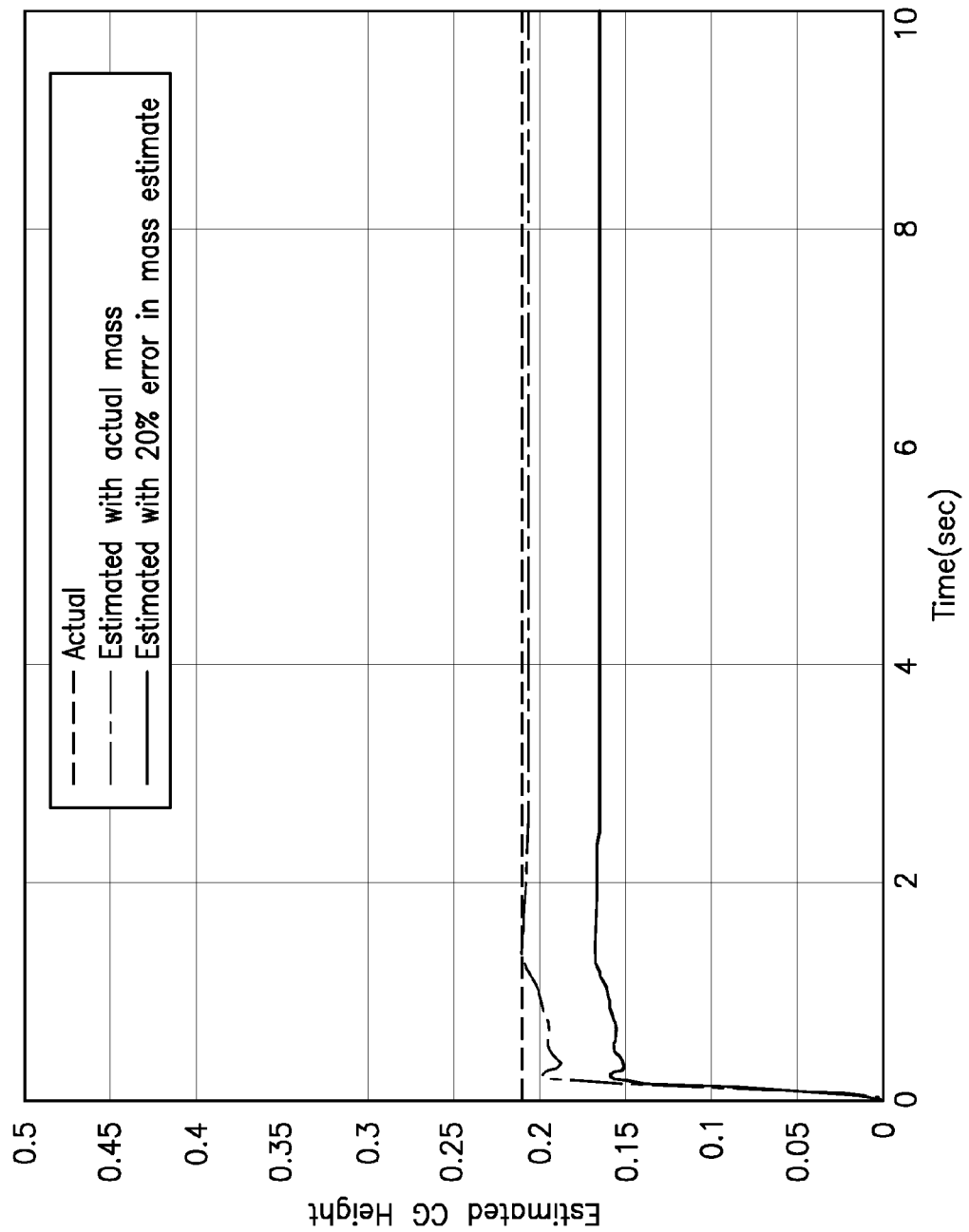
FIG. 8B is a graph of estimated CG Height vs. time comparing CarSim, estimated actual mass, and estimated with 20 percent error.

The results from a representative example of use the CG estimation methodology described above is summarized in FIGS. 8A and 8B. In FIG. 8A, the lateral acceleration of the vehicle in "−g's"; the steering wheel angle in degrees; and the roll, vehicle in degrees are graphed, respectively. In FIG. 8B, the estimated CG Height is graphed vs. time showing Actual CG height, estimated CG height with actual mass; and estimated CG height with a 20 percent error in mass introduced. The close relationship of the graphed results for the three conditions indicates that the CG height estimation methodology is valid and may be used incorporating the Load Estimation (using Effective Rolling Radius) methodology set forth above.

From the foregoing, it will be appreciated that the subject methodologies achieve an accurate weight estimation using a tire attached TPMS unit. Vehicle center of gravity height information may further be derived using a sensor fusion approach which combines tire sensed load information with vehicle CAN-bus information. The sensor fusion approach enables estimation of vehicle CG height which may be used in a roll stability control (RSC) algorithm. The information of the global load and of the load distribution (using the described effective rolling radius of each tire) can be used in advanced brake control systems to optimize system performance and reduce vehicle stopping distance. The weight estimation may further be used to eliminate the need for weigh stations.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A load estimation system for estimating a vehicle load comprising:
   at least one tire supporting a vehicle;
   a tire-mounted sensor attached to the tire and comprising a rotation counter for generating a rotation count from rotation of the tire;
   a vehicle-based distance measuring device measuring distance travelled by the vehicle and producing distance travelled input data;
   an effective radius calculator calculating effective radius of the tire from the distance travelled and the rotation count; and
   wherein the effective radius calculator operably calculates effective radius of the tire by dividing a distance measured by the distance measuring device by a product of the rotation count times $2\pi$;
   a rotation time measuring calculator for measuring the time for one rotation from data derived from the tire-mounted sensor;
   a vehicle speed calculating calculator for calculating vehicle speed by dividing the effective radius of the tire times $2\pi$ by the time for one rotation pursuant to the formula: Vehicle speed=(Effective Radius of Tire*$2\pi$)/(Time of one revolution);
   load estimation means for calculating the load carried by the vehicle tire from the effective radius;
   wherein data from the load estimating means is communicated to an operator of the vehicle by a communication device that is operative connected to the vehicle or communicated to a vehicle control device.

2. The load estimation system of claim 1, wherein the distance measuring device comprises a global positioning system.

3. A load estimation system for estimating a vehicle load comprising:
   at least one tire supporting a vehicle;
   a tire-mounted sensor attached to the tire and comprising a rotation counter for generating a rotation count from rotation of the tire;
   a vehicle-based distance measuring device measuring distance travelled by the vehicle and producing distance travelled input data;
   an effective radius calculator calculating effective radius of the tire from the distance travelled and the rotation count;
   load estimation means for calculating the load carried by the vehicle tire from the effective radius; and
   wherein data from the load estimating means is communicated to an operator of the vehicle by a communication device that is operative connected to the vehicle or communicated to a vehicle control device;
   wherein the distance measuring device comprises a global positioning system;
   wherein the effective radius calculator operably calculates effective radius of the tire by dividing a distance measured by the global positioning system by a product of the rotation count times $2\pi$;
   wherein further comprising a rotation time measuring calculator for measuring the time for one rotation from data derived from the tire-mounted sensor; and
   a vehicle speed calculating calculator for calculating vehicle speed by dividing the effective radius of the tire times $2\pi$ by the time for one rotation pursuant to the formula: Vehicle speed=(Effective Radius of Tire*$2\pi$)/(Time of one revolution).

4. The load estimation system of claim 3, wherein further comprising a tire-based tire pressure and temperature monitoring sensor for measuring tire pressure and tire temperature.

5. The load estimation system of claim 4, wherein the load estimation means comprises a computer receiving as inputs from the tire-based sensor the tire pressure, tire temperature, and receiving as further inputs the effective radius, and vehicle speed, and the computer calculating a load estimation from the inputs by means of a load estimation algorithm.

6. The load estimation system of claim 5, wherein further comprising tire vertical stiffness calculating means for determining a tire vertical stiffness from the tire-based sensor tire pressure and tire temperature measurements, and the vehicle speed, the calculated tire vertical stiffness comprising a further input into the load estimation algorithm.

7. The load estimation system of claim 6, wherein the load estimation algorithm comprises a recursive least squares algorithm receiving as input the tire vertical stiffness, the tire effective rolling radius, and a tire original radius as inputs.

8. The load estimation system of claim 5, wherein the load estimation means operably calculates a respective load carried by a plurality of tires supporting the vehicle.

9. The load estimation system of claim 8, wherein an estimated total load carried by the vehicle comprises a summation of the respective loads of the plurality of tires.

10. The load estimation system of claim 9, further comprising a center of gravity height estimation means for estimating a vehicle center of gravity from the estimated total load.

11. A method of determining an estimated vehicle load carried by a tire comprising:
    determining a rotation count from a tire-mounted sensor affixed to the tire;
    measuring the distance travelled by the vehicle from a vehicle-based distance-measuring device;
    calculating an effective radius of the tire from the distance travelled and the rotation count; and
    calculating the load carried by the vehicle tire from the effective radius;

communicating data representing the load calculation to an operator of the vehicle by a communication device that is operative connected to the vehicle or communicated to a vehicle control device;

wherein the vehicle-based distance measuring device comprises a global positioning system;

wherein calculating an effective radius of the tire comprises dividing a distance measured by the global positioning system by the rotation count times $2\pi$; and measuring rotation time for one rotation of the tire from a tire-based sensor; and calculating vehicle speed from dividing the product of the effective radius of the tire times $2\pi$ by the time for one rotation pursuant to the formula: Vehicle speed=(Effective Radius of Tire*$2\pi$)/(Time of one revolution).

12. The method of claim 11, wherein further comprising measuring tire pressure and tire temperature of the tire respectively from a tire-based sensor; and using the sensor-measured tire pressure and tire temperature, and effective radius, and vehicle speed as collective inputs in calculating a load estimation by means of a load estimation algorithm.

13. The method of claim 12, wherein further comprising determining a tire vertical stiffness from the sensor-measured tire pressure and tire temperature, and vehicle speed and using the vertical stiffness as an additional input in the load estimation algorithm.

14. The method of claim 13, wherein further comprising estimating a total load carried by the vehicle by a summation of respective loads on a plurality of tires.

15. The method of claim 14, further comprising estimating a center of gravity of the vehicle from the estimated total load.

\* \* \* \* \*